United States Patent [19]

Punj

[11] Patent Number: 5,282,198
[45] Date of Patent: Jan. 25, 1994

[54] INITIALIZATION OF DATA STATIONS ON A DUAL BUS DATA SUBNETWORK

[75] Inventor: Vikram Punj, Naperville, Ill.

[73] Assignee: AT&T Bell Laboratories, Murray Hill, N.J.

[21] Appl. No.: 554,624

[22] Filed: Jul. 18, 1990

[51] Int. Cl.[5] .......................................... H04L 12/40
[52] U.S. Cl. ....................................................... 370/85.9
[58] Field of Search ................. 370/85.9, 85.15, 85.12, 370/85.6, 85.1; 340/825.15

[56] References Cited

U.S. PATENT DOCUMENTS

| | | | |
|---|---|---|---|
| 4,977,557 | 12/1990 | Phung et al. | 370/85.9 |
| 5,072,443 | 12/1991 | Hahne et al. | 370/85.9 |
| 5,081,622 | 1/1992 | Nassehi et al. | 370/85.6 |
| 5,124,981 | 6/1992 | Golding | 370/85.9 |

OTHER PUBLICATIONS

Standard for Local Area Network MAC (Media Access Control) Bridges, P802.1d/D9, Jul 14, 1989, prepared by the IEEE 802.1.

"Transparent Bridges for Interconnection of IEEE 802 Lans", Floyd Backes, *IEEE Network,* Jan. 1988, vol. 2, No. 1, pp. 5–9.

*Primary Examiner*—Benedict V. Safourek
*Assistant Examiner*—Min Jung
*Attorney, Agent, or Firm*—Werner Ulrich

[57] ABSTRACT

This invention relates to a method and apparatus for determining which bus should be used for transmitting data to another station of a dual queue, dual bus DQDB network. Initially, data is transmitted over both buses. As each station receives an entity of data, such as packets or cells, over one bus, each entity including the identification of a transmitting station, the receiving station updates its memory to record that entities of data to that transmitting station should be transmitted over the other bus. The bus selection record is audited when packets are received to confirm its accuracy.

15 Claims, 3 Drawing Sheets

INITIALIZATION OF DATA STATIONS ON A DUAL BUS DATA SUBNETWORK

TECHNICAL FIELD

This invention relates to communications in data networks, and, more specifically, dual bus networks.

PROBLEM

In data networks, it is frequently desirable to have arrangements whereby a group of stations attached to ports on one or more buses can exchange data rapidly over the buses interconnecting such stations. A local area network is one example of such a system wherein all stations on the local area network communicate via a bidirectional bus which interconnects all of these stations. Another arrangement is a dual bus arrangement wherein the stations communicate over a pair of unidirectional buses, for transmitting data in opposite directions. One such arrangement is the dual queue, dual bus (DQDB) subnetwork defined in the proposed IEEE Standard 802.6, the standard for Metropolitan Area Networks. In this arrangement, each station is connected to both members of the dual bus by an add/-drop interface whereby each station can place a cell of data on the bus, remove a cell of data from the bus or pass a cell of data on the bus to the next station. Cells of data which are passed may be examined by the station in the process of being so passed. The cells of data are cells sent in a protocol called the asynchronous transfer mode (ATM).

The two buses are terminated in a Slave Station (SS) on one end and a Master Station (MS) on the other end. In a metropolitan area network, the Master Stations are interconnected by a data switch (or Multi-Port Bridge). The functions of the dual queue, dual bus (DQDB) are defined in IEEE Standard 802.6. For the purposes of this disclosure, it is only necessary to say that the SS generates idle cells for which the stations on the DQDB bus can substitute active cells containing data on the upstream bus (the bus transmitting data from the SS to the MS) and the MS transmits idle cells and active cells containing data between the switch and the stations on the DQDB subnet transmitting data to these stations over the downstream bus (the bus for transmitting data from the MS to the SS) and receiving data over the upstream bus. Idle cells that terminate from the incoming bus to the SS are absorbed therein; the SS generates and transmits a stream of idle cells on its outgoing bus.

In this type of network, it is wasteful of resources for a station to transmit data in both directions over both members of the dual bus; the data has to be placed on a bus twice thus decreasing the aggregate throughput of the DQDB subnetwork and increasing the work load of the stations and interfaces. Therefore a station should advantageously know if the destination station it wishes to communicate with is upstream/downstream of it. However, at initialization time or following the addition of a station movement of one of the stations on the bus, each station does not know which bus to use in order to transmit data to other stations. A problem of the prior art is that there is no satisfactory arrangement available for efficiently and automatically making this determination.

Solution

The above problem is solved and an advance is made over the prior art in accordance with the principles of this invention wherein, in a departure from the prior art, at each port on a bus, on receiving the beginning of a data entity, a device attached to the port identifies the bus to be used for transmitting to the port from which the entity was received; thereafter, that bus is used for transmitting data to that port. The received packet need not be destined for the receiving port. This arrangement can be used during initialization time and thereafter to build up and maintain the data for determining which bus to use in transmitting a data message and can be audited continuously or periodically to ensure that this data is still current. Such data need only be maintained for ports with which a port communicates, so that if this is known ahead of time, only data for communicating ports is maintained in the records of a station. For the specific case of a DQDB bus, the identified bus is the unidirectional bus of the DQDB that is oppositely directed from the receiving bus.

In accordance with one specific implementation, during initialization time when the relative location of a particular destination is not known, a cell or packet is initially sent over both buses. When an acknowledgement or response is received from the destination, this acknowledgment cell is transmitted and received over only one of the buses since the destination has determined, on the basis of the bus over which it received the message, whether the source is upstream or downstream. Thus, the destination identifies the bus to be used for transmission to the source.

DETAILED DESCRIPTION

Figure 1:
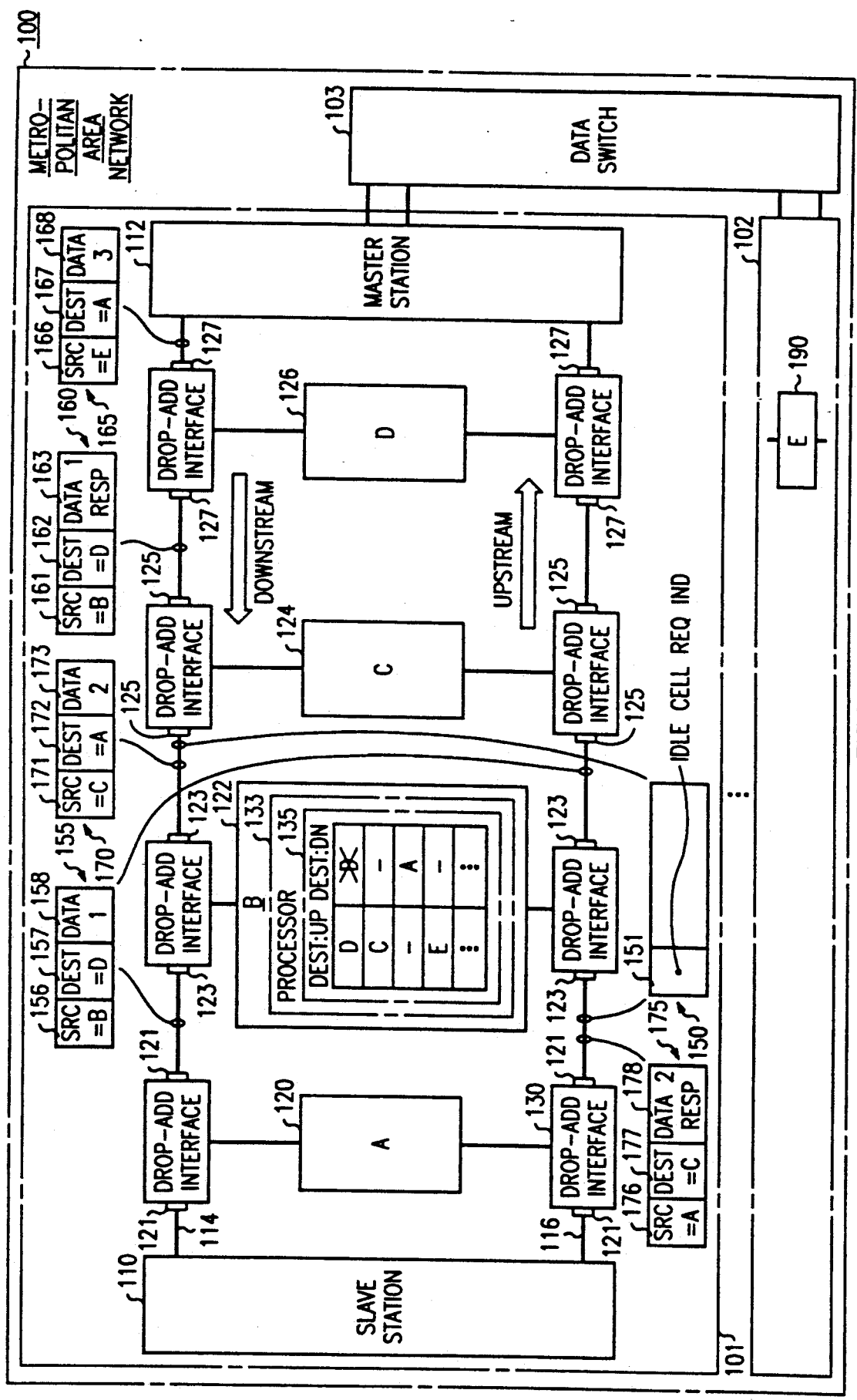
FIG. 1 is a block diagram of a metropolitan area data network including a plurality of DQDB subnetworks.

FIG. 1 is a block diagram of a metropolitan area data network comprising a plurality of subnetworks 101, . . . , 102 interconnected by a data switch 103. Subnetwork 101, a typical subnetwork, comprises a SS 110 and MS 112 interconnected by a downstream bus 114 for transmitting data in the direction from the MS to the SS and an upstream bus 116 for transmitting data in the direction from the SS toward the MS. Buses 114 and 116 are the two buses of a dual queue, dual bus (DQDB) arrangement. The details of the access control mechanism of the DQDB arrangement are described in IEEE Standard 802.6 which is incorporated herein by reference. Idle cells are generated for the upstream bus 116 by SS 110 and for the downstream bus 114 by MS 112. MS 112 generates and transmits idle cells and transmits cells containing data received from stations in other metropolitan area subnetworks such as 102. Each of these buses (114, 116) is connected to each of the four stations A, B, C, and D labeled 120, 122, 124, and 126 at ports 121, 123, 125 and 127, respectively, by an add/drop interface 130. Each port is shown in four parts, i.e., at the input and output to the two add/drop interfaces; the port is considered to be the combination of these four ports, representing the interface between the bus and the add/drop interfaces of one station. The add/drop interface permits each station to receive from an incoming unidirectional connected bus, transmit to the corresponding outgoing unidirectional connected bus, and pass information from the incoming unidirectional bus to the outgoing unidirectional bus. Each of the stations, such as station B (block 122), comprises a processor 133 containing a table 135 of data describing which terminals are upstream, i.e., toward the MS, and which terminals are downstream, i.e., toward the SS, from the station controlled by this processor. If a station wishes to send a cell, it sends a request message to all stations in the opposite direction from the direction in which it wishes to send. Such requests are treated by the receiving stations as request to transmit some received idle cells without entering a message therein; this allows idle cells to be received at a station that wishes to send a cell. This arrangement is more fully described in IEEE Standard 802.6.

The following example will illustrate how the control table 135 for station 122 (station B) is initialized. The contents of this table are initially blank. Let us assume that station B desires to send a message to station D (126) but does not know whether station D is upstream or downstream. Initially, station B marks the entry for station D as being active for both upstream and downstream. Station B sends a cell 150 requesting idle cells in both the upstream and downstream directions. Cell 150 comprises an idle cell request 151, which for IEEE Standard 802.6 is a single bit. The objective of an idle cell request message is to inform intermediate stations, i.e., stations between the requesting station and MS 112 or SS 110, on each of the buses that a station wishes to transmit data and that these stations should permit one idle cell per request to proceed without introducing data into these cells. When station B then receives an idle cell, it substitutes data cell 155. Data cell 155 includes a source identification B (segment 156), a destination identification D (segment 157), and data labeled data 1 (segment 158).

When a station changes orientation, messages are bound to be lost. In this case, the loss having been detected by a timeout on the protocol, the station treats it like an initialization case, i.e., send it both directions.

Although station B sends in data on both buses, station D will receive B's cell 155 only on bus 116 since D is upstream from station B. (B's cell 155 on the downstream bus 114 is terminated at SS 110 and is eliminated there; such messages are not looped around bus 114 to bus 116.) When station D receives cell 155, it responds by sending cell 160, identifying the source D in segment 161, the destination B in segment 162, and the response to the data 1 portion of cell 155 in segment 163. This cell 160 is sent only on downstream bus 114 because station D received cell 155, to which this is a response, on its upstream bus 116. When station B receives cell 160, it recognizes that this message was received on the downstream bus 114 and that the source of this message, identified as D in segment 161, is therefore upstream of it.

FIG. 1 shows the contents of table 135 in station B. Initially, these contents are blank. When cell 155 is transmitted, both an upstream and a downstream entry is made for station D. When the response from station D appears on the downstream bus 114 indicating that station D is upstream, the downstream entry for D is deleted as shown by the crossing out of entry D in the downstream column.

FIG. 1 also shows a cell 170 from source C station 124 (segment 171) to destination A (station 120) (segment 172) containing data 2 (segment 173). While this cell does not terminate in B it passes through B's interface 130 on bus 114. In response to detecting a cell from source C on the downstream bus, processor 133 marks C as being upstream from station B in table 135 and enters a blank for the corresponding downstream entry. Note that processor 133 cannot yet make any assumption concerning where destination A may be found since source C may be sending initial cells in both directions. However, the fact that a cell from source C appears on the downstream bus to terminal B is an indication that source C is in fact upstream from terminal B. In response to receiving cell 170, terminal A transmits a cell 175 comprising the source identification A in segment 176, the destination identification C in segment 177, and the data responsive to data 2 in segment 168; cell 175 is detected on its way to destination C in the add/drop interface 130 of station B. Since this cell is detected on the upstream bus, terminal B recognizes that terminal A is downstream from terminal B and so marks the appropriate entry in table 135.

Finally, if a cell from source E (block 190) in subnetwork 102 is received by terminal B via data switch 103 and MS 112 over the downstream bus 114, then terminal B recognizes that terminal E is upstream from terminal B and so marks the appropriate entry in table 135.

Although a dual table is shown, a single table with an indicator (upstream, downstream, unknown) for each entry could also be used.

In case it is unnecessary for a particular station to know about the location or even existence of some stations in the metropolitan area network, the station simply will not record the upstream or downstream status that can be discovered from messages from or to such stations.

This arrangement has the advantage that no special signaling is required to permit each station to build up its upstream/downstream tables. The integrity of any particular entry in the table is ensured within one message exchange, sometimes even before a message is sent. A configuration change, either an addition, or a deletion, or a relative movement on a DQDB bus, will automatically be reflected in the upstream/downstream tables.

Figure 2:
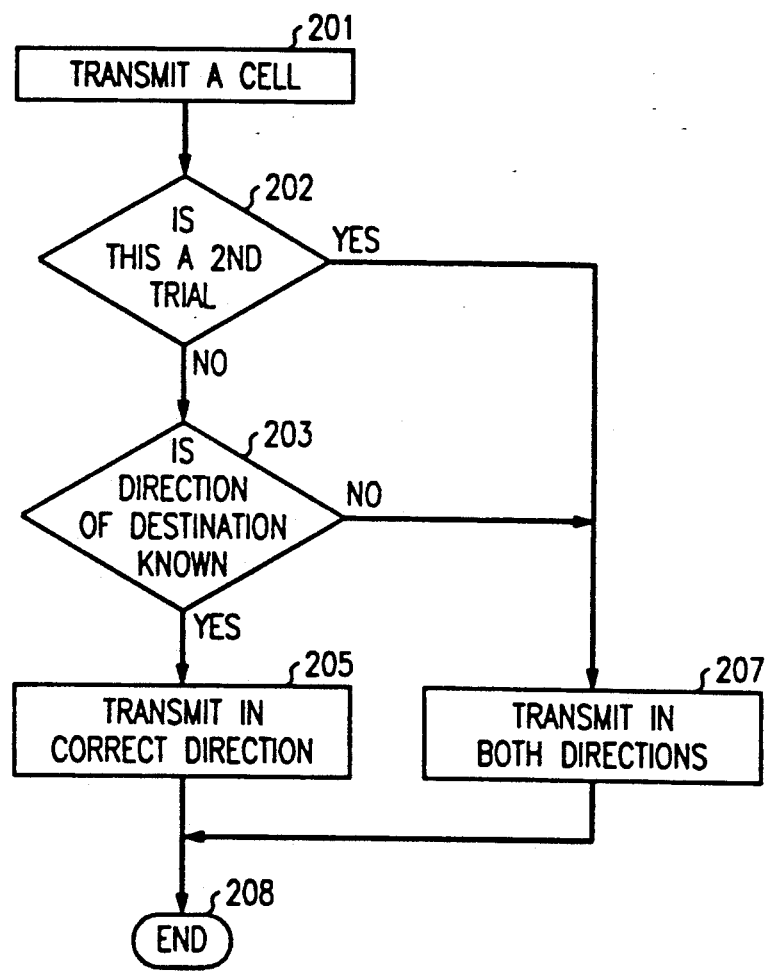
FIG. 2 is a flow diagram of the process of transmitting a cell from a station on a DQDB bus.

FIG. 2 is a flow chart of the actions to be performed in transmitting a cell. First, it is recognized that it is necessary to transmit a cell (action block 201). If this is the second try ("yes" output of test 202), then the message is transmitted in both directions (action block 207). Otherwise ("no" output of test 202), test 203 determines whether the direction of the destination is known. If so, then the cell is transmitted in the correct direction (action block 205). If not, the cell is transmitted in both directions (action block 207). Blocks 205 and 207 are followed by end block 208, the end of the transmitting action.

Figure 3:
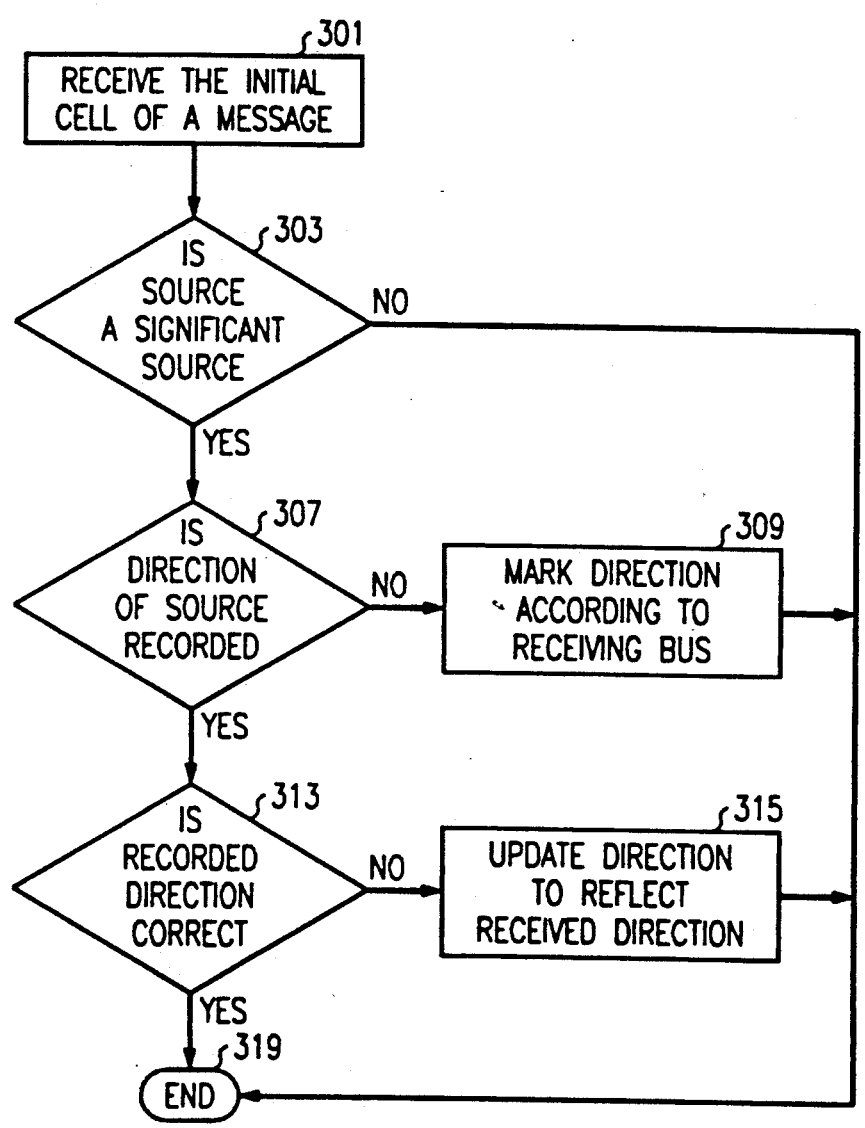
FIG. 3 is a flow diagram of the process of receiving a cell at a station on a DQDB bus.

FIG. 3 is a flow diagram of actions performed in response to receiving or monitoring cells on one of the buses. When an initial cell of a message which may be an acknowledgment of a message previously sent out on the two buses, is received or monitored (action block 201), the process begins. An initial cell is chosen because the initial cell has the identification of the source and the destination. Test 303 determines the source is a significant source, i.e., a source with which this station is already communicating or wishes to communicate. If not, no further action is taken (end block 305). If so, then test 307 determines whether the direction of the source is recorded. If not, then the direction is recorded in accordance with the receiving bus of this cell (action block 309) and the process is terminated (end block 311). If the direction of the source has been recorded, then test 313 determines if the recorded direction is consistent with the direction from which the cell has been received. If so, then the action is terminated (end block 319). If the recorded direction is not consistent with the received direction, then the recorded direction is updated to reflect the received direction (action block 315) and the process is completed (end block 317).

While the exemplary embodiment of the invention is a DQDB network or subnetwork, the principles of the invention can be applied to other types of data networks wherein the bus for transmitting to a node, port or station is identified in response to receiving a data entity from that node, port or station. For example, the master station of the network can use this arrangement to identify the bus to be used for transmitting data entities to any station of the network. The term data station as used herein refers to any station transmitting and/or receiving data signals, wherein the data signals include, for example, video signals, facsimile signals, and packetized voice signals. Similarly, the subnetwork of the description and of the title can be a complete network, or a subnetwork of a larger network, the subnetworks being connected via a data switch interconnecting their respective master stations.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. In a data network comprising a plurality of unidirectional buses and a first port, said first port connected to at least two oppositely directed of said unidirectional buses, a method of transmitting data to a second port, connected to at least two of said at least two oppositely directed buses, comprising:
   responsive to receiving in said first port a first entity of data from said second port, identifying a bus for transmitting data to said second port; and
   responsive to said identifying, transmitting a second entity of data from said first port to said second port over the bus identified in said identifying step;
   wherein said identifying comprises recording in memory data for identifying said bus for transmitting data to said second port.

2. The method of claim 1 wherein said first entity of data is received from a first unidirectional bus of said at least two oppositely directed unidirectional buses, and said identified bus is an oppositely directed second unidirectional bus of said at least two oppositely directed unidirectional buses, wherein said at least two oppositely directed unidirectional buses are connected to a common set of ports.

3. In a data network comprising a plurality of unidirectional buses and a first port, said first port connected to at least two oppositely directed of said unidirectional buses, a method of transmitting data to a second port, connected to at least two of said at least two oppositely directed buses, comprising:
   responsive to receiving in said first port a first entity of data from said second port, identifying a bus for transmitting data to said second port; and
   responsive to said identifying, transmitting a second entity of data from said first port to said second port over the bus identified in said identifying step;
   prior to receiving said first entity of data from said second port, sending a third entity of data from said first port to said second port over two oppositely directed unidirectional buses connected to said first port, for identifying a bus for receiving data from said first port in said second port.

4. In a data network comprising a plurality of unidirectional buses and a first port, said first port connected to at least two oppositely directed of said unidirectional buses, a method of transmitting data to a second port, connected to at least two of said at least two oppositely directed buses, comprising:
   responsive to receiving in said first port a first entity of data from said second port, identifying a bus for transmitting data to said second port; and
   responsive to said identifying, transmitting a second entity of data from said first port to said second port over the bus identified in said identifying step;
   responsive to receiving in said first port a third data entity from a third port, said third entity not destined for said first port, identifying a bus for transmitting data to said third port; and
   responsive to said identifying a bus for transmitting data to said third port, transmitting a fourth data entity to said third port over the bus identified for transmitting data to said third port.

5. For a data station connectable to a plurality of oppositely directed unidirectional data buses, the buses connectable to an additional plurality of stations, apparatus comprising:
   means responsive to receiving a first entity of data on one of said buses, said first entity identifying one of said plurality of stations as a transmitting station, for identifying another of said buses for use in transmitting data to said one station; and
   means responsive to said means for identifying for transmitting a second entity of data to said one station on the identified bus;
   wherein said means for identifying comprises:
   memory means for storing an identity of said another bus.

6. For a data station connectable to a plurality of oppositely directed unidirectional data buses, the buses connectable to an additional plurality of stations, apparatus comprising:
   means responsive to receiving a first entity of data on one of said buses, said first entity identifying one of said plurality of stations as a transmitting station, for identifying another of said buses for use in transmitting data to said one station; and
   means responsive to said means for identifying for transmitting a second entity of data to said one station on the identified bus;
   wherein said means for transmitting comprises means for transmitting another entity of data over ones of said plurality of buses if said means for identifying has not identified a bus for transmitting data to another station that is a destination of said another entity of data.

7. For a data station connectable to a plurality of oppositely directed unidirectional data buses, the buses connectable to an additional plurality of stations, apparatus comprising:
   means responsive to receiving a first entity of data on one of said buses, said first entity identifying one of said plurality of stations as a transmitting station, for identifying another of said buses for use in transmitting data to said one station; and means responsive to said means for identifying for transmitting a second entity of data to said one station on the identified bus;

wherein said means for identifying are responsive to a third entity of data not destined for said data station for identifying a bus for transmitting to a source of said third entity.

8. In a data subnetwork comprising a pair of unidirectional buses to which all stations of the subnetwork are connected, a method of determining relative position on said pairs of unidirectional buses, comprising:

responsive to receiving a first entity of data in a first of said stations, said first entity identifying as a source a second of said stations, on a first of said buses, recording in memory of said first station an indication that said second station precedes said first station on said first bus;

responsive to receiving a second entity of data, said second entity identifying a third station, on a second of said buses, recording in memory of said first station an indication that said third station precedes said first station on said second bus;

responsive to said step of recording an indication that said second station precedes, transmitting entities of data from said first station to said second station over said second bus; and responsive to said step of recording an indication that said first station precedes, transmitting entities of data from said first station to said third station over said first bus.

9. The method of claim 8 further comprising:

prior to the first recording step and to receiving said first entity, sending a third entity of data from said first station to said second station over said first and said second bus.

10. The method of claim 8 further comprising:

responsive to receiving a first entity of data from a fourth station on said first bus, said entity not destined for said first station, recording an indication in said first station that said fourth station precedes said second station on said first bus.

11. The method of claim 8 wherein said data entities are data cells sent in an asynchronous transfer mode (ATM) protocol.

12. A data station connectable to a pair of oppositely directed unidirectional data buses, the buses connectable to an additional plurality of data stations, comprising:

memory means for storing the identity of a bus for use in transmitting data to ones of said additional plurality of data stations;

means responsive to receiving a first entity of data, said first entity identifying one of said plurality of stations as a transmitting station, on a first of said buses, for recording in said memory means an identity of a second of said buses for use in transmitting data to said one station; and means for transmitting a data entity to one of said additional plurality of data stations over a bus identified in said memory means.

13. The data station of claim 12 further comprising add/drop interfaces connectable to each of said buses; and wherein said means for recording are further responsive to receiving an other data entity, said other data entity identifying an other of said plurality of stations as a transmitting station, said other data entity received on one of said buses and not destined for said station, for recording in said memory means an identity of said other transmitting station of said other entity for a bus other than said one bus.

14. The data station of claim 12 wherein said means for transmitting a data entity transmits said data entity over both of said buses if a destination station of said data entity is not recorded in said memory means as being a station for which data entities should be transmitted on one of said buses.

15. The data station of claim 14 further comprising a master station and a slave station;

wherein a first of said buses transmits from a master station to a slave station and a second of said buses transmits from a slave station to a master station;

wherein a master station is further connected to a data switch for accessing other data subnetworks;

wherein data entities for other data networks are transmitted over said second bus;

wherein said slave station generates idle data entities for transmission over said second bus and said master station transmits data entities received from said data switch and transmits idle data entities over said first data bus;

wherein said means for transmitting transmit a data entity on one of said buses upon receipt by an add/drop interface connected to said one bus of an idle data entity;

wherein data entities received via said master station from another subnetwork are received over said first bus and are therefore identified as being from data stations to which said data station transmits over said second bus.

* * * * *